United States Patent [19]
Kuroda

[11] Patent Number: 5,935,248
[45] Date of Patent: Aug. 10, 1999

[54] SECURITY LEVEL CONTROL APPARATUS AND METHOD FOR A NETWORK SECURING COMMUNICATIONS BETWEEN PARTIES WITHOUT PRESETTING THE SECURITY LEVEL

[75] Inventor: Yasutsugu Kuroda, Kawasaki, Japan

[73] Assignee: Fujitsu Limited, Kawasaki, Japan

[21] Appl. No.: 08/724,757

[22] Filed: Oct. 3, 1996

[30] Foreign Application Priority Data

Oct. 19, 1995 [JP] Japan ..................................... 7-271578

[51] Int. Cl.⁶ ....................................................... G06F 13/00
[52] U.S. Cl. ......................................................... 713/201
[58] Field of Search ............................... 395/186, 187.01, 395/200.55, 726; 364/222.5, 286.4; 340/825.31

[56] References Cited

U.S. PATENT DOCUMENTS

| | | | |
|---|---|---|---|
| 5,012,515 | 4/1991 | McVitie | 380/49 |
| 5,018,096 | 5/1991 | Aoyama | 364/900 |
| 5,204,961 | 4/1993 | Barlow | 395/725 |
| 5,263,147 | 11/1993 | Francisco et al. | 395/425 |
| 5,355,474 | 10/1994 | Thuraisngham et al. | 395/600 |
| 5,369,707 | 11/1994 | Follendore, III | 380/25 |
| 5,475,625 | 12/1995 | Glaschick | 395/600 |
| 5,550,984 | 8/1996 | Gelb | 395/200.17 |
| 5,563,998 | 10/1996 | Yaksich et al. | 395/149 |
| 5,563,999 | 10/1996 | Yaksich et al. | 395/149 |
| 5,586,260 | 12/1996 | Hu | 395/200.2 |
| 5,596,718 | 1/1997 | Boebert et al. | 395/187.01 |
| 5,675,782 | 10/1997 | Montague et al. | 395/609 |
| 5,699,513 | 12/1997 | Feigen et al. | 395/187.01 |

FOREIGN PATENT DOCUMENTS

| | | | |
|---|---|---|---|
| 0375138 A2 | 6/1990 | European Pat. Off. | H04L 12/58 |
| 0409397 A2 | 6/1990 | European Pat. Off. | G06F 1/00 |
| 0375139 A2 | 1/1991 | European Pat. Off. | H04L 12/58 |
| 0520709 A2 | 12/1992 | European Pat. Off. | G06F 1/00 |
| 0534679 A2 | 3/1993 | European Pat. Off. | G07C 9/00 |

OTHER PUBLICATIONS

Varadharajan et al., "A Multilevel Security Model for a Distributed Object–Oriented System", IEEE, pp. 68–78, Dec. 1990.

Hinke, "The Trusted Server Approach to Multilevel Security" IEEE, pp. 335–341, Dec. 1989.

*Primary Examiner*—Joseph E. Palys
*Assistant Examiner*—Stephen C. Elmore
*Attorney, Agent, or Firm*—Staas & Halsey LLP

[57] ABSTRACT

In a security level control apparatus for controlling a security level of a communication established between communication parties, this security level control apparatus is arranged by employing a security level recognizing unit and a security level setting unit. The security level recognizing unit recognizes a security level notified from a communication party. The security level setting unit sets the security level recognized by the security level recognizing unit as a security level for the security level control apparatus. In accordance with this security level control apparatus, the security level of the communication party recognized by the security level recognizing unit is first set as the security level for the security level control apparatus. As a result, the communication can be established between the communication parties without presetting the security level.

13 Claims, 13 Drawing Sheets

FIG. 8

| SECURITY LEVEL OF CLIENT \ SECURITY LEVEL OF SERVER | 1 | 2 | 3 | 4 | 5 |
|---|---|---|---|---|---|
| 1 | 1 | 2 | × | 4 | × |
| 2 | 2 | 2 | × | 4 | × |
| 3 | × | 2 | 3 | × | 5 |
| 4 | × | × | × | 4 | × |
| 5 | × | × | × | 4 | 5 |

FIG. 11

SECURITY LEVEL "1"  (1)→(2)→(3)→(4)→(5)→(6)→(7)→(8)→(9)

SECURITY LEVEL "2"  (1)→(2)→(3)→(4)→(5)→(6)→(7)→(8)→(B)→(C)→(F)

SECURITY LEVEL "3"  (1)→(2)→(3)→(4)→(5)→(6)→(7)→(8)→(A)→(B)→(C)→(F)→(G)→(H)

SECURITY LEVEL "4"  (1)→(2)→(3)→(4)→(5)→(6)→(7)→(8)→(B)→(C)→(D)→(E)→(F)

SECURITY LEVEL "5"  (1)→(2)→(3)→(4)→(5)→(6)→(7)→(8)→(A)→(B)→(C)→(D)→(E)→(F)→(G)→(H)

SECURITY LEVEL CONTROL APPARATUS AND METHOD FOR A NETWORK SECURING COMMUNICATIONS BETWEEN PARTIES WITHOUT PRESETTING THE SECURITY LEVEL

BACKGROUND OF THE INVENTION

The present invention relates to a security level control apparatus, and more specifically, to a security level control apparatus for controlling security levels of communications established between communication parties.

Also, the present invention relates to a network communication system, and in particular, to a network communication system constituted by a server apparatus and a client apparatus, which perform communications, the security levels of which are set.

Network services through which electronic mails are provided are commercially available by mutually connecting computers installed in a distribution manner.

However, in network systems configured for academic purposes, typically known as the Internet, proper care is not taken to network security matters. Accordingly, these network services involve various problems, for instance wiretapping, falsification, and impersonation.

Now, a description will be made of these wiretapping, falsification, and impersonation with respect to electronic mails.

The term "wiretapping" implies that a plain text, i.e., a correspondence message not yet encrypted is read during message transmission.

The term "falsification" implies that a content of an electronic mail is modified. This falsification is performed in relaying nodes when an electronic mail is delivered via a plurality of relaying nodes.

The term "impersonation" implies that when no protection is established with respect to information for specifying a mail sender, a third party (bearing offense) falsifies the information for specifying the third party to pose as an impersonator.

To solve these network problems, at least one of the following solutions is carried out as follows. For instance, a message (data) is encrypted, an electronic signature (Message Integrity Check) is used to prevent falsification, and a user (communication party) is authenticated. In such a network communication system realized in a server/client manner, the server apparatus is authenticated and/or the client apparatus is authenticated.

As to encryption techniques, the secret key cryptosystem, the public key cryptosystem, and the like are known. In the secret key cryptosystem, the encrypting operation and the decrypting operation are carried out by using the common key between the communication parties. On the other hand, in the public key encrypting system, the key system is constituted by combining the secret keys for the individual users with the public keys, and the public keys are opened to the third party, whereas the secret keys are disclosed only to the individual users. In this public key cryptosystem, a message which has been encrypted by the public key can be solved by the secret key. For instance, when a message is transmitted from "A" to "B", "A" encrypts this message by using the public key of "B", and then "B" who has received the encrypted message can decrypt this encrypted message by using the own secret key. The person who can decrypt this encrypted message is only "B" who knows the own secret key.

As to the authentication techniques, the password authentication and the electronic signature with employment of the public key cryptosystem are known.

In the above-described conventional network techniques, a plurality of security levels are produced when certain process operations are combined with each other in order to avoid the problems such as wiretapping, falsification, and impersonation with respect to the network services.

For instance, it is conceivable that a resultant security level becomes high when electronic mail is encrypted and at the same time a user of this electronic mail is authenticated, rather than only the encryption of this electronic mail. When only the security should be emphasized, it is best to combine a large number of processing operations with each other. However, in this case, the resultant workloads would be increased.

Under such a circumstance, it is a proper solution to set the security level to which importance of a communication content is reflected. Proper setting of a security level based on importance of a message is called a "policy of security".

With respect to this "policy of security", the below-mentioned problems occur in the above-described conventional techniques.

That is, as to the first problem, the communication is performed between the communication parties in accordance with only a predetermined security policy, but cannot be carried out in accordance with other security policies.

As to the second problem, the security level of the communication party (communication destination) is continuously introduced with a top priority, so that the security level cannot be determined.

The present invention has been made to solve the above-described problems, and therefore, has a first object to provide a security level control apparatus and a network communication system, capable of executing a communication between communication parties, while a security level is not previously determined.

Also, a second object of the present invention is to provide a security level control apparatus and a network communication system, capable of executing a communication while determining the own security level.

SUMMARY OF THE INVENTION

To achieve the above-described objects, a security level control apparatus of the present invention is featured as follows. In a security level control apparatus for controlling a security level of a communication established between communication parties, this security level control apparatus is arranged by employing a security level recognizing unit and a security level setting unit.

The security level recognizing unit recognizes a security level notified from a communication party.

The security level setting unit sets the security level recognized by the security level recognizing unit as a security level for the security level control apparatus. In accordance with this security level control apparatus, the security level of the communication party recognized by the security level recognizing unit is first set as the security level for the security level control apparatus. As a result, the communication can be established between the communication parties without presetting the security level.

BRIEF DESCRIPTION OF THE DRAWINGS

A more complete understanding of the teachings of the present invention may be acquired by referring to the accompanying drawings, in which:

FIG. 8 shows a security level conversion table unit included by the security level control apparatus of the embodiment;

FIG. 11 schematically indicates a sequential process operation executed in the respective security levels of the embodiment;

DESCRIPTION OF THE PREFERRED EMBODIMENT

First Security Level Control Apparatus 10

Figure 1:
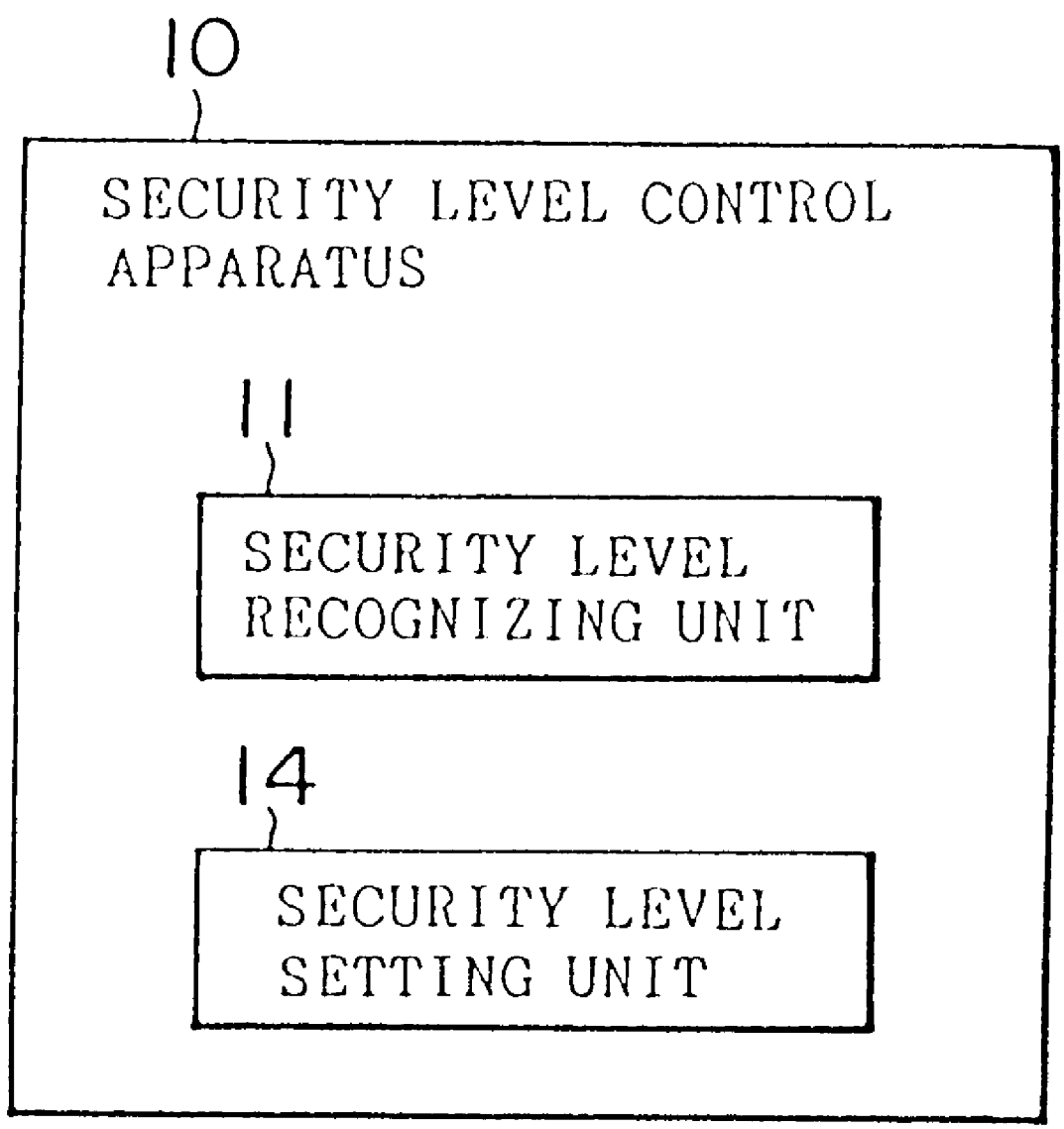
FIG. 1 is a block diagram for schematically showing a basic idea of a first security level control apparatus according to the present invention.
Figure 2:
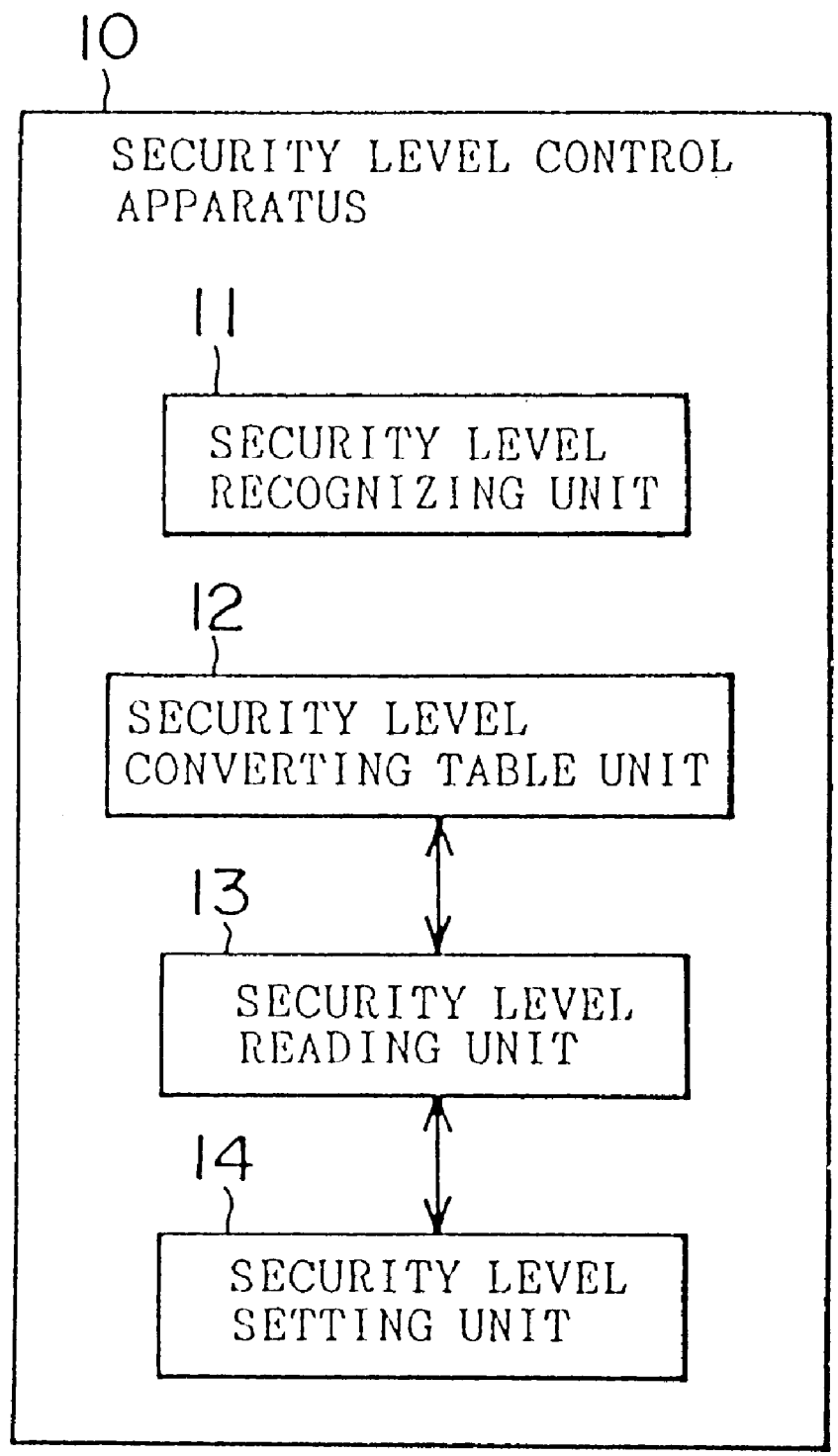
FIG. 2 is a block diagram for schematically showing a basic idea of a second security level control apparatus according to the present invention.

To solve the above-described first problem, a first security level control apparatus 10 of the present invention is arranged as follows (corresponding to claim 1). FIG. 1 is a schematic block diagram for showing a basic idea of the security level control apparatus 10 according to the present invention.

That is, the security level control apparatus 10 for controlling a security level of a communication executed between communication parties is arranged by a security level recognizing unit 11 and a security level setting unit 14.

(Security Level Recognizing Unit 11)

The security level recognizing apparatus 11 may recognize a security level notified from communication destination (communication party).

(Security Level Setting Unit 14)

The security level setting unit 14 may set the security level recognized by the security level recognizing unit 11 as a security level for the security level control apparatus 10.

In accordance with the first security level control apparatus 10 of the present invention, the following operations are carried out. First, the security level of the communication party recognized by the security level recognizing unit 11 is set as the security level for the security level control apparatus 10.

Second Security Level Control Apparatus 10

To solve the above-described second problem, a second security level control apparatus 10 of the present invention is arranged as follows (corresponding to claim 2). FIG. 1 is a schematic block diagram for showing a basic idea of the security level control apparatus 10 according to the present invention.

That is, the security level control apparatus 10 for controlling a security level of a communication executed between communication parties is arranged by a security level recognizing unit 11, a security level converting table unit 12, a security level reading unit 13, and a security level setting unit 14.

(Security Level Recognizing Unit 11)

The security level recognizing apparatus 11 may recognize a security level notified from communication destination (communication party).

(Security Level Converting Table Unit 12)

The security level converting table unit 12 may store a relationship between an index made of two sets of security levels, and a security level of an actual communication.

(Security Level Reading Unit 13)

The security level reading unit 13 may read from the security level converting table unit 12, a security level corresponding to such an index. This index is defined by the security level of the communication party recognized by the security level recognizing unit 11, and the security level for the security level control apparatus 10.

(Security Level Setting Unit 14)

The security level setting unit 14 may set the security level recognized by the security level recognizing unit 11 as the security level for the security level control apparatus 10.

In accordance with the second security level control apparatus 10 of the present invention, the following operations are carried out. First, both the security level of the communication party recognized by the security level recognizing unit 11 and the security level for the security level control apparatus 10 are set as the index. Then, the security level corresponding to this index is read from the security level converting table unit 12. Thus, this read security level is set as the security level for the security level apparatus 10.

First Network Communication System

Figure 3:
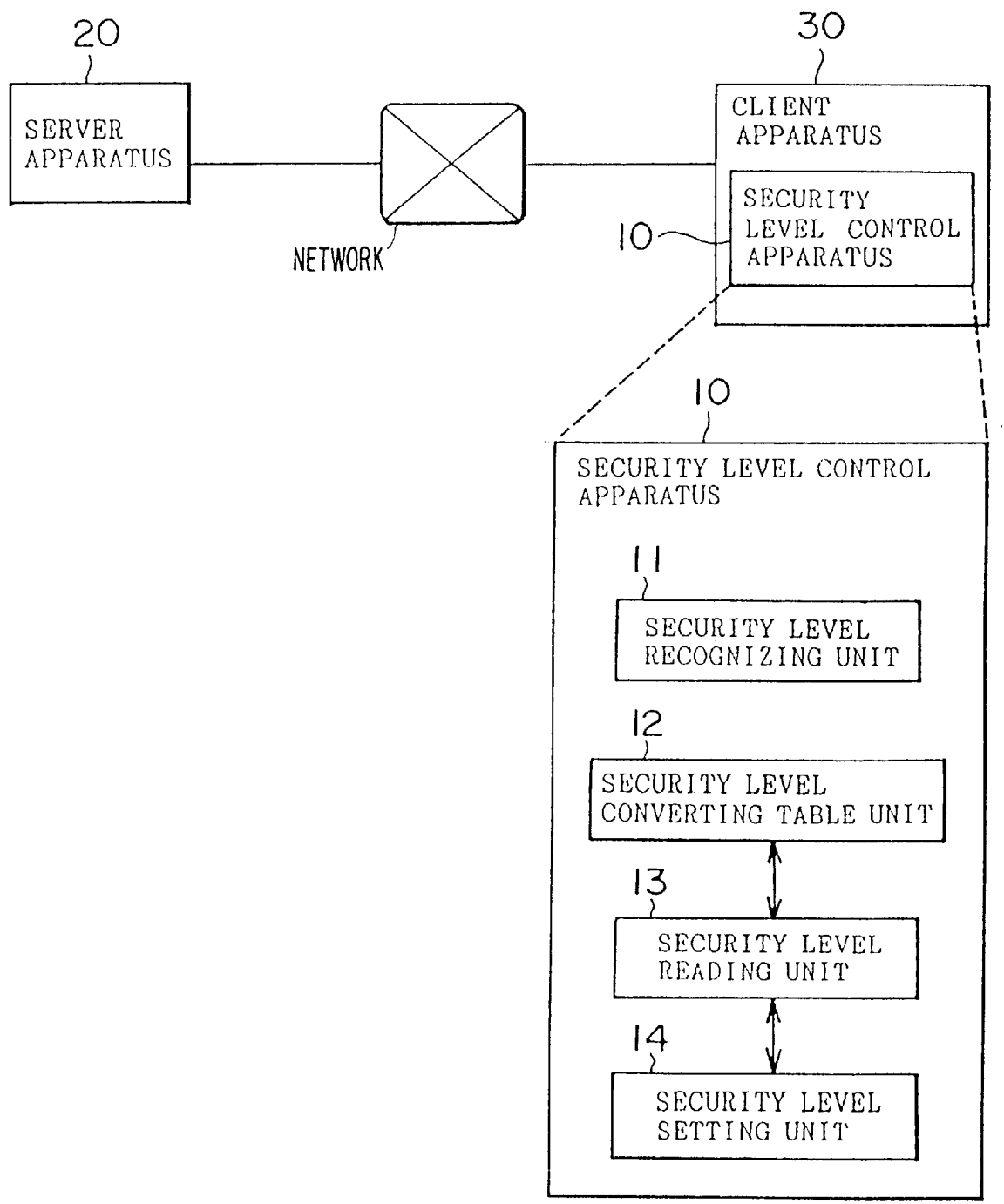
FIG. 3 is a block diagram for schematically indicating a basic idea of a first network communication system according to the present invention.

A first network communication system of the present invention is arranged by the below-mentioned arrangement so as to solve the above-described first problem (corresponding to claim 3). FIG. 3 is a schematic block diagram for indicating a basic idea corresponding to the first network communication system of the present invention.

That is, in a network communication system provided with a server apparatus 20 and a client apparatus 30, which perform a communication whose security level is set, the client apparatus 30 includes a security level control apparatus 10. Then, this security level control apparatus 10 is constructed of a security level recognizing unit 11 and a security level setting unit 14.

(Security Level Recognizing Unit 11)

The security level recognizing unit 11 may recognize a security level notified from a communication party (communication destination).

(Security Level Setting Unit 14)

The security level setting unit 14 may set the security level recognized by the security level recognizing unit 11 as a security level for the client apparatus 30.

In accordance with the first network communication system of the present invention, the following operations are carried out on the side of the client apparatus 30. First, the security level of the server apparatus 20 recognized by the security level recognizing unit 11 is set as the security level for the client apparatus 30.

Second Network Communication System

Figure 4:
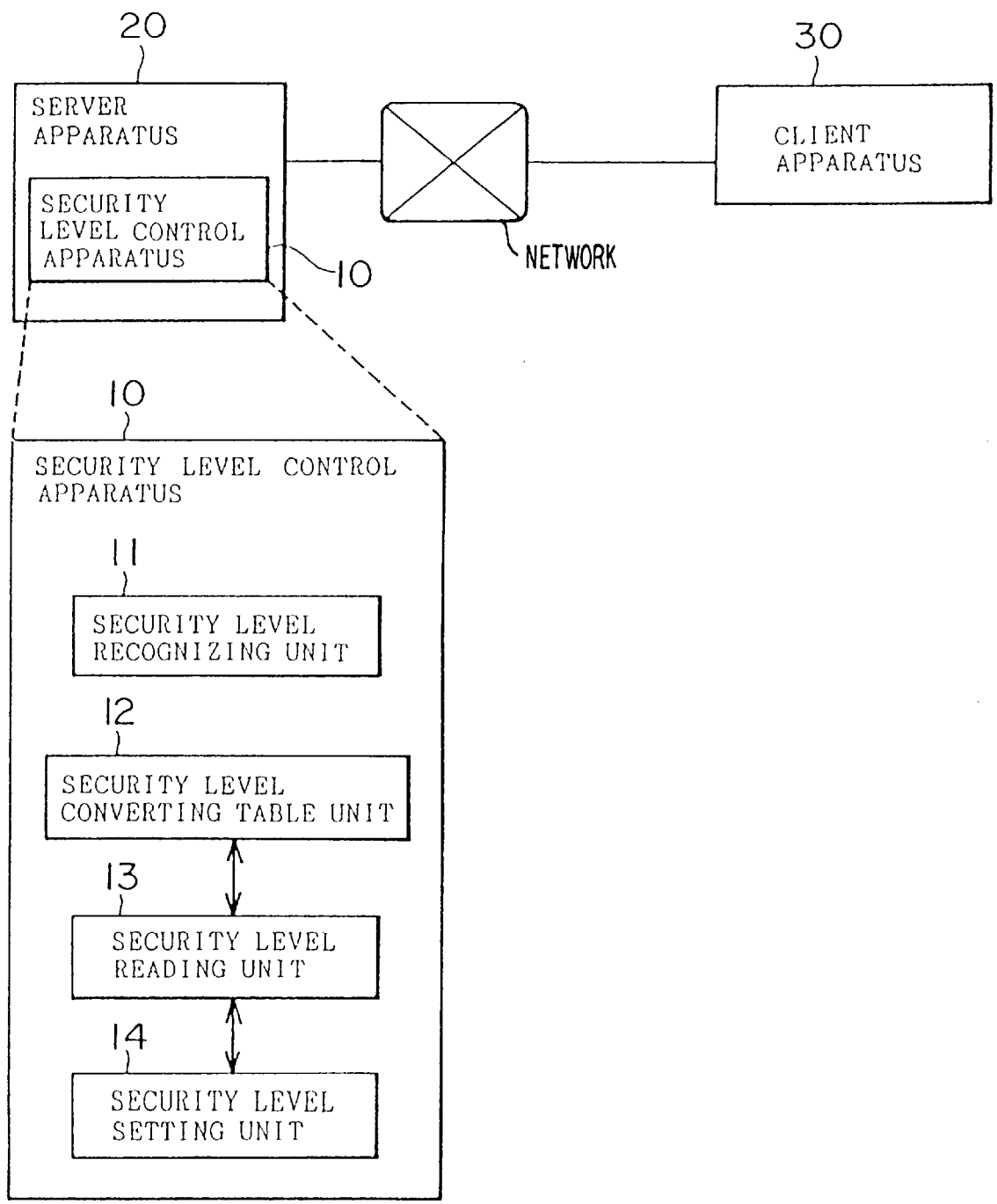
FIG. 4 is a block diagram for schematically indicating a basic idea of a second network communication system according to the present invention.

A second network communication system of the present invention is arranged by the below-mentioned arrangement so as to solve the above-described first problem (corresponding to claim 4). FIG. 4 is a schematic block diagram for indicating a basic idea corresponding to the second network communication system of the present invention.

That is, in a network communication system provided with a server apparatus 20 and a client apparatus 30, which perform a communication whose security level is set, the server apparatus 20 includes a security level control apparatus 10. Then, this security level control apparatus 10 is constructed of a security level recognizing unit 11 and a security level setting unit 14.

(Security Level Recognizing Unit 11)

The security level recognizing unit 11 may recognize a security level notified from a communication party (communication destination).

(Security Level Setting Unit 14)

The security level setting unit 14 may set the security level recognized by the security level recognizing unit 11 as a security level for the server apparatus 20.

In accordance with the second network communication system of the present invention, the following operations are carried out on the side of the server apparatus 20. First, the security level of the client apparatus 30 recognized by the security level recognizing unit 11 is set as the security level for the server apparatus 20.

Third Network Communication System

A third network communication system of the present invention is arranged by the below-mentioned arrangement so as to solve the above-described first problem (corresponding to claim 5).

That is, in the first network communication system, a plurality of the server apparatus 20 are employed.

Then, the security level control apparatus 10 provided with the client apparatus 30 may control the security level with respect to each of the server apparatus 20.

In accordance with the third network communication system of the present invention, the following operations are carried out. That is, the security levels are controlled by the server apparatus 20.

Fourth Network Communication System

A fourth network communication system of the present invention is arranged by the below-mentioned arrangement so as to solve the above-described first problem (corresponding to claim 6). That is, in the second network communication system, a plurality of the above-described client apparatuses 30 are employed. Then, the security level control apparatus 10 employed in the server apparatus 20 may control the security levels with respect to each of the client apparatuses 30.

According to the fourth network communication system, the following operation is performed. That is, the security level is controlled with respect to each of the client apparatuses 30.

Fifth Network Communication System

A fifth network communication system of the present invention is arranged by the below-mentioned arrangement so as to solve the above-described second problem (corresponding to claim 7).

That is, in either the first or third network communication system, the security level control apparatus 10 owned by the client apparatus 30 includes a security level converting table unit 12 and a security level reading unit 13.

The security level converting table unit 12 stores a relationship between an index constructed of two sets of security levels and an actual communication security level.

The security level reading unit 13 reads from the security level converting table unit 12, a security level corresponding to such an index that is constructed of a security level of a communication party recognized by the security level recognizing unit 11, and the security level for the client apparatus 30.

Then, the security level setting unit 14 sets the security level read from the security level reading unit 13 as the security level for the client apparatus 30.

In accordance with the fifth network communication system of the present invention, the following operations are carried out. First, the security level of the server apparatus 20 recognized by the security level recognizing unit 11, and the security level for the client apparatus 30 are used as the index. Then, the security level corresponding to this index is read from the security level converting table unit 12. This read security level is set as a security level for the client apparatus 30.

Sixth Network Communication System

A sixth network communication system of the present invention is arranged by the below-mentioned arrangement so as to solve the above-described second problem (corresponding to claim 8).

That is, in either the second or fourth network communication system, the security level control apparatus 10 owned by the server apparatus 20 includes a security level converting table unit 12 and a security level reading unit 13.

The security level converting table unit 12 stores a relationship between an index constructed of two sets of security levels and an actual communication security level.

The security level reading unit 13 reads from the security level converting table unit 12, a security level corresponding to such an index that is constructed of a security level of the client apparatus 30 recognized by the security level recognizing unit 11 and the security level for the server apparatus 20.

Then, the security level setting unit 14 sets the security level read from the security level reading unit 13 as the security level for the server apparatus 20. In accordance with the sixth network communication system of the present invention, the following operations are carried out. First, the security level of the client apparatus 30 recognized by the security level recognizing unit 11, and the security level for the server apparatus 20 are used as the index. Then, the security level corresponding to this index is read from the security level converting table unit 12. This read security level is set as a security level for the server apparatus 20.

Seventh Network Communication System

A seventh network communication system of the present invention is arranged by the below-mentioned arrangement so as to solve the above-described second problem (corresponding to claim 9).

That is, in the fifth network communication system, the security level control apparatus 10 owned by the client apparatus 30 may dynamically change the security level even during the communication in response to a request from the client apparatus 30.

In accordance with the seventh network communication system of the present invention, the following operations are carried out. That is, the security levels are dynamically variable even during the communication.

Eighth Network Communication System

An eighth network communication system of the present invention is arranged by the below-mentioned arrangement so as to solve the above-described second problem (corresponding to claim 10).

That is, in the sixth network communication system, the security level control apparatus owned by the server apparatus may dynamically change the security level even during the communication in response to a request from the server apparatus.

In accordance with the eighth network communication system of the present invention, the following operations are carried out. That is, the security levels are dynamically variable even during the communication.

Ninth Network Communication System

Figure 5:
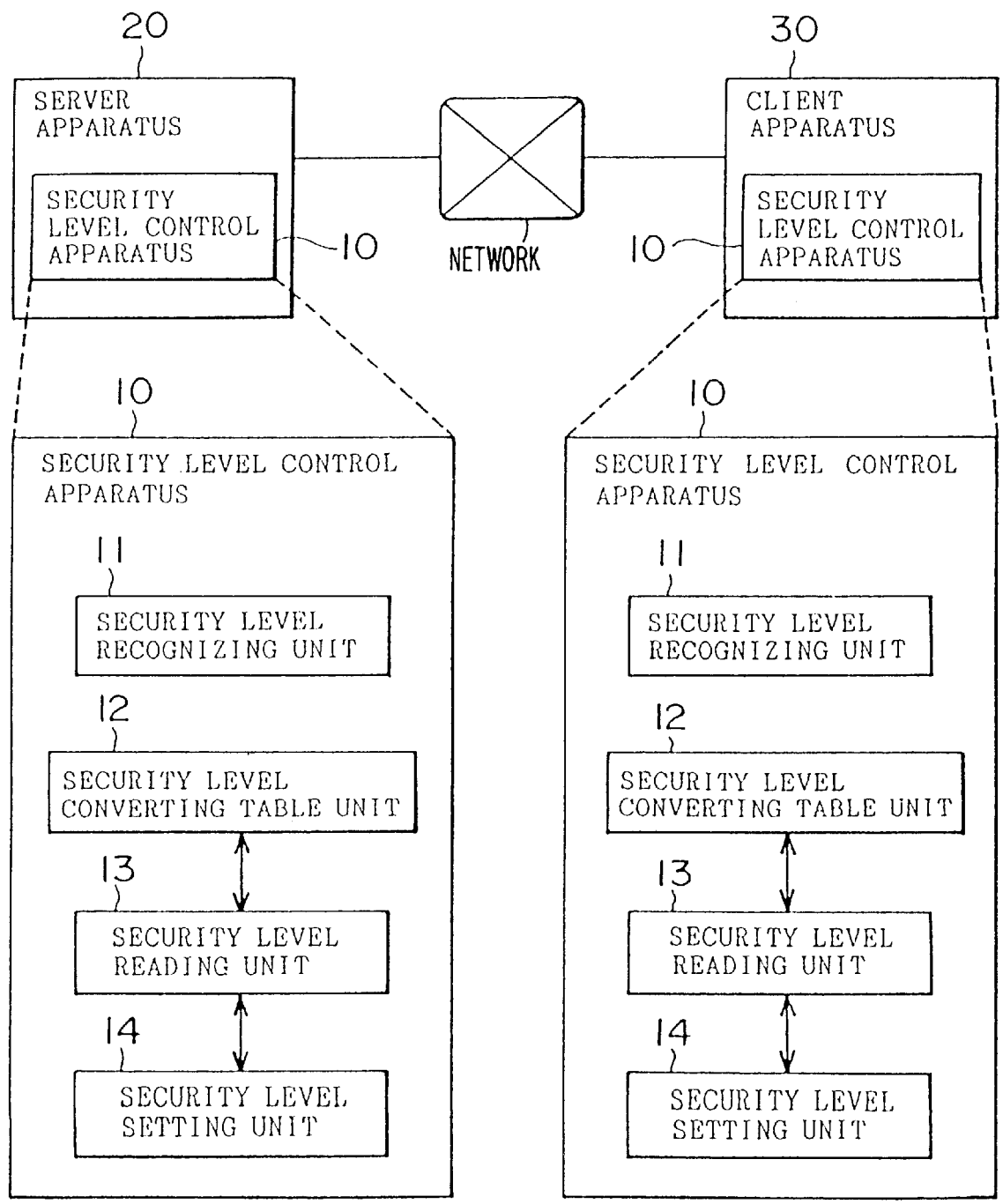
FIG. 5 is a block diagram for schematically indicating a basic idea of a ninth network communication system according to the present invention.

A ninth network communication system of the present invention is arranged by the below-mentioned arrangement so as to solve the above-described second problem (corresponding to claim 11). FIG. 5 is a schematic block diagram for indicating a basic idea corresponding to the ninth network communication system of the present invention.

That is, in a network communication system provided with the server apparatus 20 and the client apparatus 30, which perform a communication whose security level is set, the server apparatus 20 and the client apparatus 30 include security level control apparatuses 10. Then, this security level control apparatus 10 is constructed of a security level recognizing unit 11, a security level converting table unit 12, a security level reading unit 13, and a security level setting unit 14.

(Security-Level Recognizing Unit 11)

The security level recognizing unit 11 may recognize a security level notified from a communication party.

(Security Level Converting Table Unit 12)

The security level converting table unit 12 stores a relationship between an index constructed of two sets of security levels and an actual communication security level.

(Security Level Reading Unit 13)

The security level reading unit 13 reads from the security level converting table unit 12, a security level corresponding to such an index that is constructed of the security level of the communication party recognized by the security level recognizing unit 11 and the security level for the security level control apparatus 10.

(Security Level Setting Unit 14)

The security level setting unit 14 sets the security level read from the security level reading unit 13 as the security level for the security level control apparatus 10.

In accordance with the ninth network communication system, the following operations are carried out. First, both the security level of the communication party recognized by the security level recognizing unit 11 and the security level for the security level control apparatus 10 are used as the index. Then, the security level corresponding to this index is read from the security level converting table unit 12. This read security level is set as the security level for the security level apparatus 10.

Tenth Network Communication System

A tenth network communication system of the present invention is arranged by the below-mentioned arrangement so as to solve the above-described second problem (corresponding to claim 12).

That is, in the ninth network communication system, the security level control apparatus 10 owned by the client apparatus 30 may dynamically change the security level even during the communication in response to a request from the client apparatus 30.

Then, the security level control apparatus 10 owned by the server apparatus 20 may dynamically change the security level even during the communication in response to a request from the server apparatus 20.

In accordance with the tenth network communication system of the present invention, the following operations are carried out. That is, the security levels are dynamically variable even during the communication.

(Embodiment Modes)

Various embodiment modes of the present invention will now be described with reference to the drawings.

(System Arrangement of Embodiment Mode)

Figure 6:
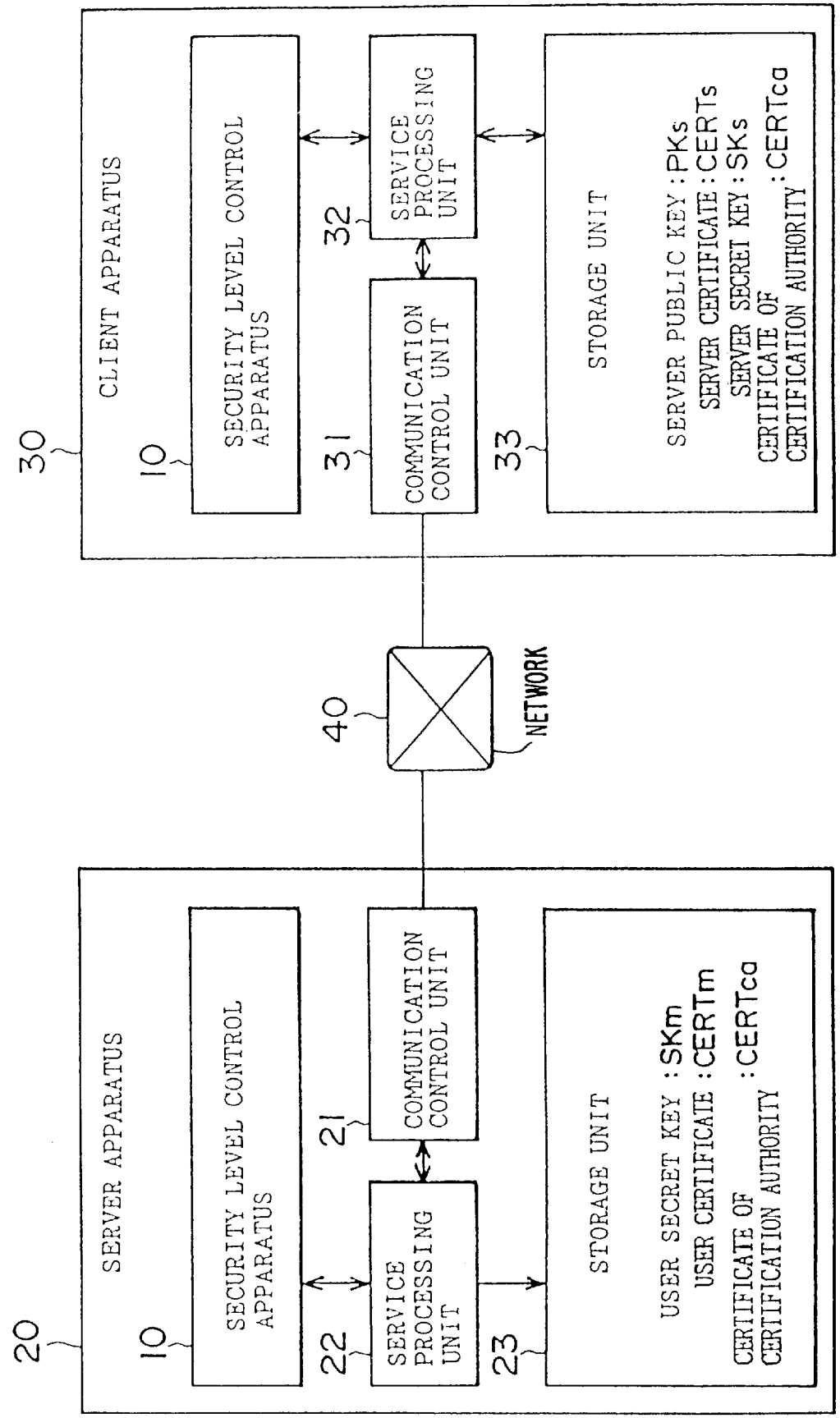
FIG. 6 schematically represents an arrangement of a system according to an embodiment of the present invention.

A system of an embodiment mode is arranged by employing a server apparatus 20 (also, referred to as a "server"), as shown in FIG. 6, a network 40 connected to this server apparatus, and a client apparatus 30 (also, referred to as a "client") connected to this network 40.

In this system, a communication is established between the server apparatus 20 and the client apparatus 30. To prevent wiretapping, falsification, and impersonation in the communication, five stages of security levels can be set in accordance with importance of communication contents.

It should be noted that although only one server apparatus 20 is indicated in FIG. 6, a plurality of server apparatuses may be employed. Similarly, although only one client apparatus 30 is shown in this drawing, a plurality of client apparatuses may be employed.

(Security Level)

When the communication starts, the server apparatus 20 and the client apparatus 30 notify independently set security levels to the counter party. Therefore, the server apparatus 20 and the client apparatus 30 communicate in accordance with security levels determined based upon the mutual security levels.

As previously described, in accordance with this embodiment, the security levels may be set in the five stages. These five-staged security levels are set as follows:

Security Level "1"—Neither encryption nor authentication is performed. It is a so-called "normal communication".

Security Level "2"—Only encryption is carried out.

Security level "3"—Both encryption and user authentication are performed.

Security level "4"—Both encryption and server authentication are carried out.

It should be noted that this security level "4" is a security level equivalent to the security level "3".

Security level "5"—Encryption, user authentication, and server authentication are carried out.

It should also be noted that when a plurality of client apparatuses 30 are provided, the server apparatus 20 may communicate in response to the security levels independently set for the respective client apparatuses 30.

It should be also noted that when a plurality of server apparatuses 20 are provided, the client apparatus 30 may communicate in response to the security levels independently set for the respective server apparatuses 20.

Then, as the security level, other items may be set as follows. That is, no encryption is carried out at the security levels "2" to "5", and alternatively, the client is authenticated at the security levels "2" to "5".

Furthermore, the expression "user authentication" involves authentication with employment of a password, and authentication with employment of a public key certification. This embodiment mode describes the authentication with employment of the public key certification.

(Arrangement of Server Apparatus 20)

The server apparatus 20 is arranged by employing a communication control unit 21 connected to the network 40, a service processing unit 22 connected to this communication control unit 21, a security level control apparatus 10 connected to this service processing unit 22, and a storage unit 23 connected to the service processing unit 22.

The communication control unit 21 controls the communication established between the server apparatus 20 and the network 40.

To accept various service requests issued from the server apparatus 20, the service processing unit 22 transmits/receives the data among the security level control apparatus 10, the communication control unit 21, and the storage unit 23.

The storage unit 23 stores therein information concerning a user secret key (SKm: "m" being subscript), a user certification (CERTm: "m" being subscript), and a certification of an issuing station (CERTca: "ca" being subscript). As this storage unit 23, for instance, a RAM (Random Access Memory), a semiconductor memory device, a magnetic disk storage apparatus, a magnetic tape recording apparatus, an M/O (Magneto-Optical) disk apparatus, and an IC card are employed.

The security level control apparatus 10 is an apparatus for controlling security of actually performed communications based upon the security level notified from the client apparatus 30 and the security level owned by the server apparatus 20 when the communication is commenced. An arrangement of the security level control apparatus 10 will be explained subsequent to the description about the arrangement of the client apparatus 30.

(Arrangement of Client Apparatus 30)

The client apparatus 30 is arranged by employing a communication control unit 31 connected to the network 40, a service processing unit 32 connected to this communication control unit 31, a security level control apparatus 10 connected to this service processing unit 32, and a storage unit 33 connected to the service processing unit 32.

The communication control unit 31 controls the communication established between the server apparatus 20 and the network 40.

To accept various service requests issued from the client apparatus 30, the service processing unit 32 transmits/receives the data among the security level control apparatus 10, the communication control unit 31, and the storage unit 33.

The storage unit 33 stores therein information concerning a server Public key (PKs: "s" being subscript), a server certificate (CERTs: "s" being subscript), a server secret key (SKs: "s" being subscript), and a certificate of a Certification Authority (CERTca: "ca" being subscript). At this storage unit 33, for instance, a RAM (Random Access Memory), a semiconductor memory device, a magnetic disk storage apparatus, a magnetic tape recording apparatus, an M/O (Magneto-Optical) disk apparatus, and an IC card are employed.

The security level control apparatus 10 is such an apparatus for negotiating the security level notified from the server apparatus 20 with the security level owned by the client apparatus 30 when the communication is commenced.

(Arrangement of Security Level Control Apparatus 10)

Since the security level control apparatus 10 provided with the server apparatus 20 is arranged similar to the security level control apparatus 10 employed in the client apparatus 30, the arrangement thereof will now be described without giving any discrimination.

Figure 7:
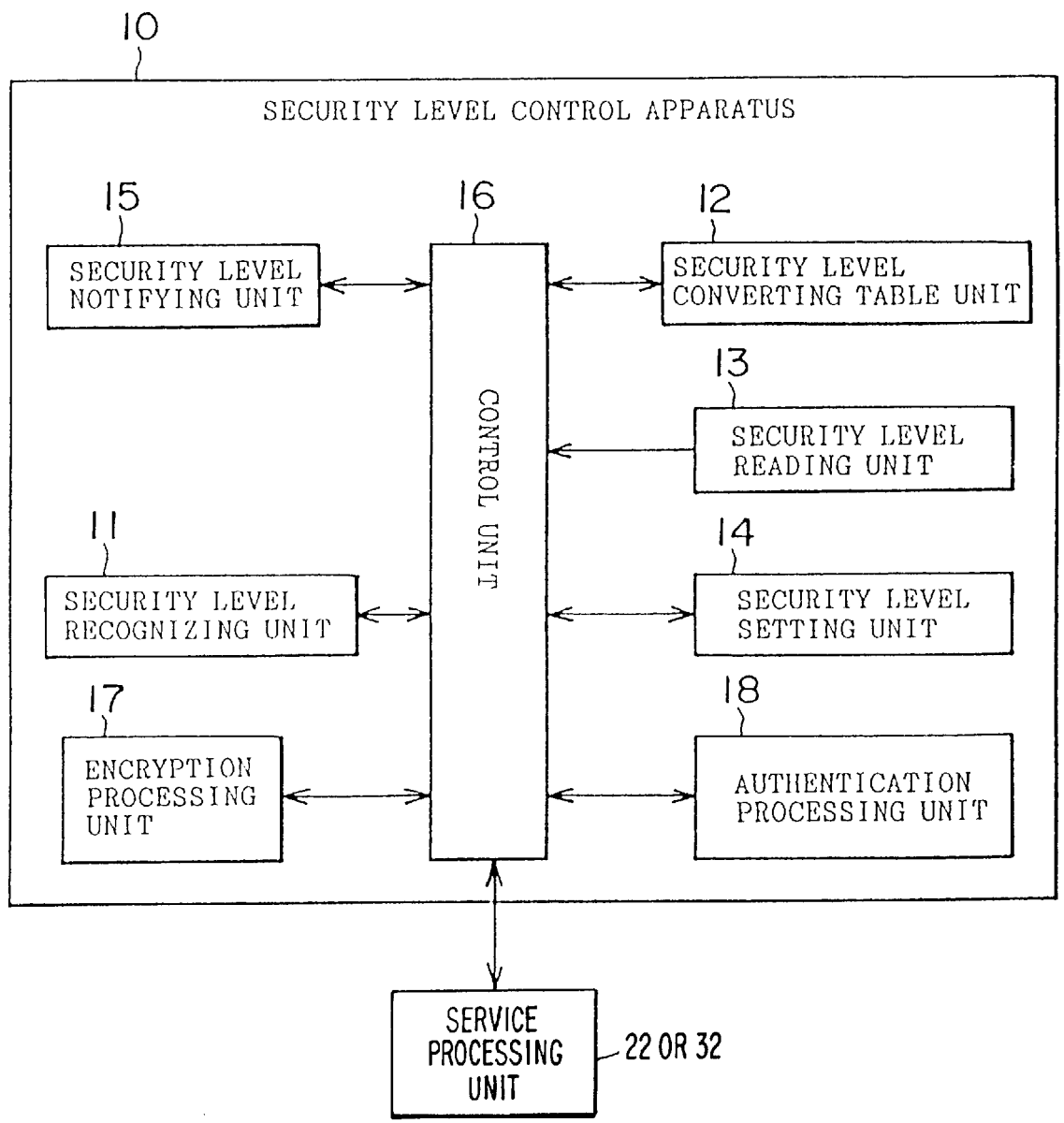
FIG. 7 is a schematic block diagram for showing an arrangement of the security level control apparatus of the embodiment.

As shown in FIG. 7, the security level control apparatus 10 is constituted by employing a control unit 16, a security level recognizing unit 11, a security level converting table unit 12, a security level setting unit 14, a security level notifying unit 15, an encryption processing unit 17, and an authentication processing unit 18.

The control unit 16 is connected to either the service processing unit 22 (in case of server apparatus 20) or the service processing unit 32 (in case of client apparatus 30), and also connected to the security level recognizing unit 11, the security level converting table unit 12, the security level reading unit 13, the security level setting unit 14, the security level notifying unit 15, the encryption processing unit 17, and the authentication processing unit 18. Then, the control unit 16 controls data transmitting/receiving operations among these units.

The security level recognizing unit 11 recognizes the security level notified from the communication party.

The security level converting table unit 12 sets the index of the server to 1 through 5, and also the index of the client to 1 through 5 in such a case that the security levels used in the network are set to five stages, i.e., 1 through 5, which all the servers and all the clients can own in order that any of these servers and clients can use this converting table. Then, the security level concerning table unit 12 is arranged in such a manner that any one of the 25 patterns in total can be obtained based upon the security levels requested by the respective servers and clients which actually perform the communications.

In FIG. 8, there is shown the security level converting table unit 12 according to this embodiment. In the case of FIG. 8, assuming now that the security level of the client is "2" and the security level of the server is "4", the security level of the actual communication becomes "4". It should be noted in this drawing that a portion indicated as "X" implies that no communication can be performed at the security levels set by the server apparatus 20 and the client apparatus 30. In other words, this "X" portion corresponds to such a case that the security levels cannot be controlled.

As described above, the security level converting table unit 12 according to this embodiment is arranged as the following table, considering that the information provided by the server is important. That is, when the security level requested by the server is higher than the security level requested by the client, the security level requested by the server may have a priority.

However, the structure of the security level converting table unit 12 is not limited to the above-described embodiment. Alternatively, for example, the security level converting table unit 12 may be arranged by that only a security level which can be required by an own apparatus is set as a first index, and all of security levels which can be required by a counter party's apparatus are set as a second index. For instance, assuming now that in the above-described network, the own apparatus corresponds to the client which can require the security levels 1 through 3, and that the counter party's apparatus corresponds to the server which can require the security levels 1 through 5, any one of 15 patterns may be obtained, namely 15 patterns (in total)=indexes (3) of own apparatus x indexes (5) of the server.

While using the security level of the communication party recognized by the security level recognizing unit 11 and the security level for the security level control apparatus 10, as the index, the security level reading unit 13 reads a security level corresponding to this index from the security level converting table unit 12.

The security level setting unit 14 sets the security level read out from the security level reading unit 13 as the security level for the security level control apparatus 10.

The security level notifying unit 15 notifies the own security level to the communication party.

The encryption processing unit 17 encrypts a message to be outputted to the communication party, and conversely, decrypts the encrypted message entered from the communication party. It should be understood in this embodiment that the DES (Data Encryption Standard) system is utilized as the secret key cryptosystem, whereas the RAS (Rivest-Shamir-Aldeman) system is employed as the public key cryptosystem.

The authentication processing unit 18 performs server authentication (in case of client apparatus 30), and user authentication.

(Sequential Process Operation Between Client Apparatus 30 and Server Apparatus 20)

Figure 9:
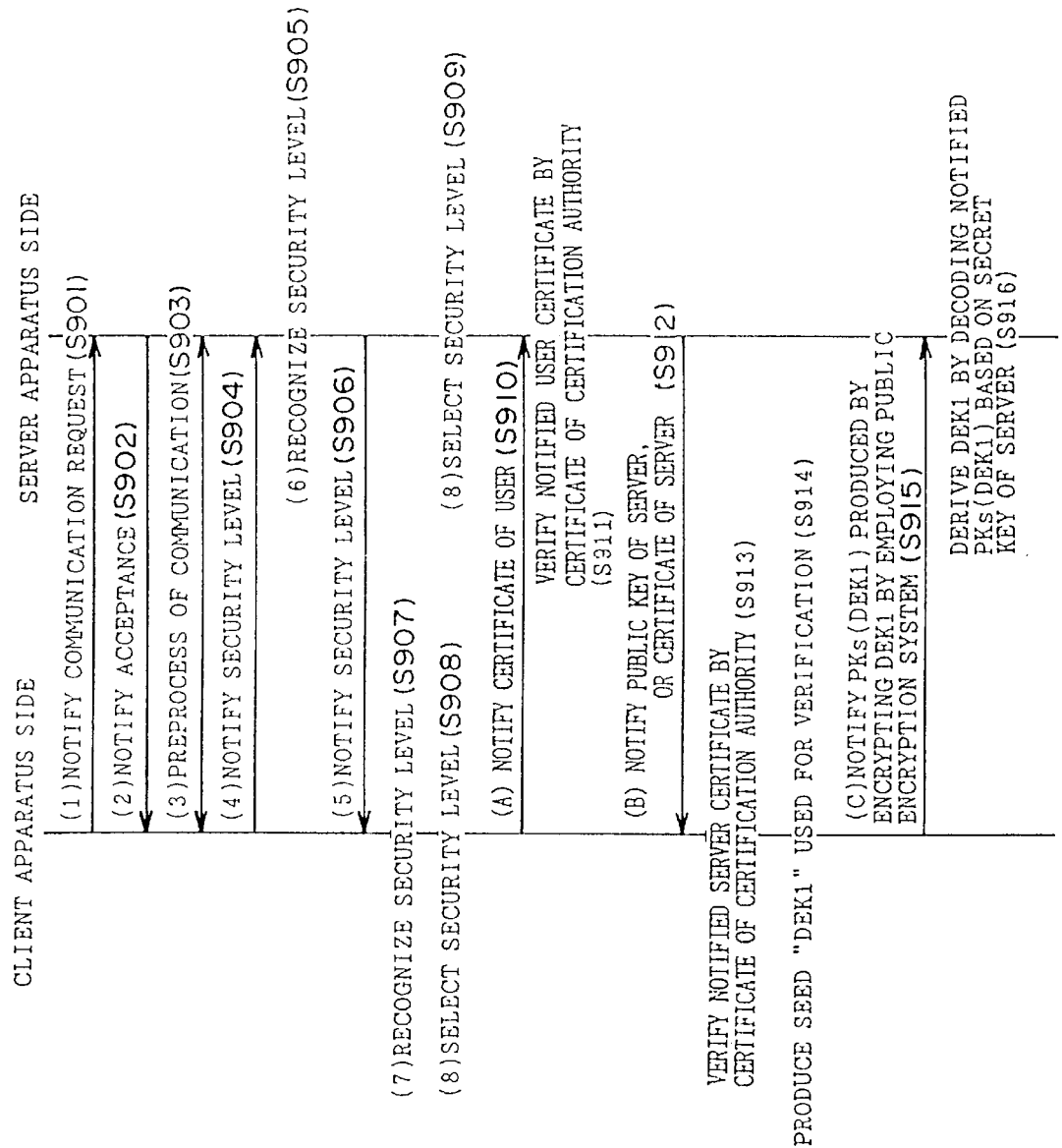
FIG. 9 schematically represents a first sequential process operation executed between the client apparatus and the server apparatus according to the embodiment.
Figure 10:
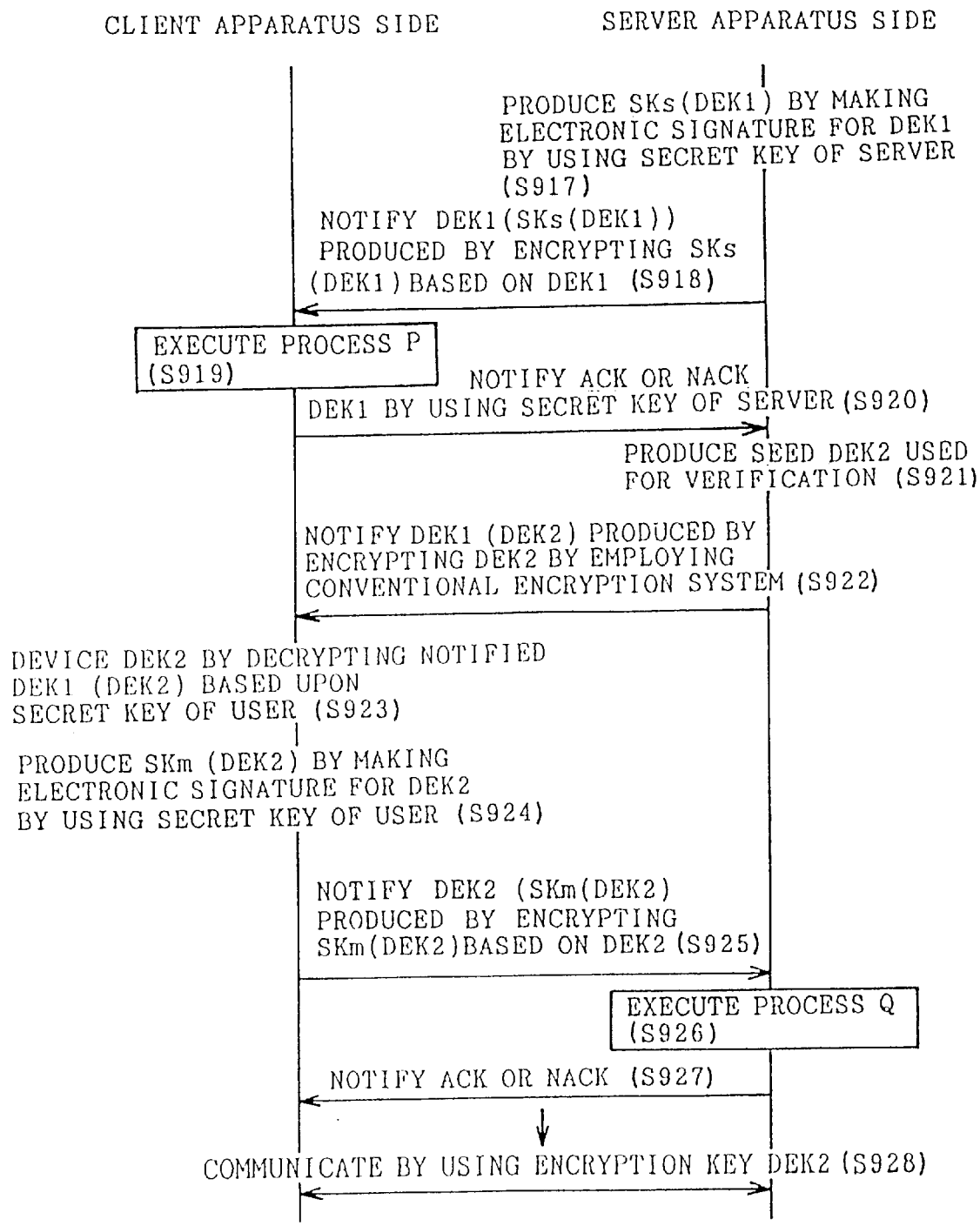
FIG. 10 schematically represents a second sequential process operation executed between the client apparatus and the server apparatus according to the embodiment.

Referring now to FIG. 9 and FIG. 10, a description will be made of sequential process operation between the client apparatus 30 and the server apparatus 20 in the embodiment mode. It should be understood that all of the sequential process operations are not executed in this explanation, but only necessary process operations are executed every security level.

First, the client apparatus 30 notifies a communication request to the server apparatus 20 (step 901, this notification is expressed as "1"). In response this communication request, the server apparatus 20 notifies acceptance to the client apparatus 30 (step 902, this notification is indicated as "2").

After the acceptance is notified to the client apparatus 30, a communication preprocess operation is carried out between the client apparatus 30 and the server apparatus 20 (step 903, this preprocess operation is indicated by "3"). In this case, the communication preprocess operation implies information exchanges, for instance, information about terminal type, information about display system (how information is displayed by which line, which digit), information about sort of used character code, and IP address.

After the preprocess operation is complete, the client apparatus 30 notifies the security level set by the client apparatus 30 to the server apparatus 20 (step 904, this notification is indicated by "4"). Upon receipt of this notification, the server apparatus 20 recognizes the security level set by the client apparatus 30 (step 905, this recognition is indicated by "6").

Subsequently, the sever apparatus 20 notifies the security level set by the server apparatus 20 to the client apparatus 30 (step 906, this notification is indicated by "5"). Upon receipt of this notification, the client apparatus 30 recognizes the security level set by the server apparatus 20 (step 907, this recognition is denoted by "7").

In accordance with the security level set by the client apparatus 30 and the security level notified from the server apparatus 20, the client apparatus 30 selects the security level of the actually performed communication (step 908, this selection is expressed by "8").

In accordance with the security level set by the server apparatus 20 and the security level notified from the client apparatus 30, the server apparatus 20 selects the security level of the actually performed communication (step 909, this selection is expressed by "8").

It should be understood that the security levels selected at the step 908 and the step 909 are coincident with each other.

Thereafter, the client apparatus 30 notifies the user certification (CERTm) to the server apparatus 20 (step 910, this notification is expressed by "A").

The server apparatus 20 verifies the notified user certificate based on the certificate of the Certification Authority (CERTca) (step 911).

The server apparatus 20 notifies the public key (PKs) of the server, or the certification (CERTs) of the server to the client apparatus 30 (step 912, this notification is indicated by "B").

The client apparatus 30 verifies the notified certificate (CERTs) of the server based upon the certificate (CERTca) of the issuing Certification Authority step 913).

Also, the client apparatus 30 produces "DEK1" corresponding to seed for authentication (in this case, authentication of server) by way of random numbers (step 914).

Thereafter, the client apparatus 30 notifies to the server apparatus 20, PKs (DEK1) produced by encrypting "DEK1" based upon the public key (PKs) of the server (step 915, this notification is indicated by "C"). In other words, the client apparatus 30 corresponding to a "sender" encrypts a session key used to read the statement based on the public key (PKs) of the server apparatus 20 corresponding to a "receiver". Up to the present processing stage, since there is no session key for the client apparatus 30 and the server apparatus 20, the encryption is carried out by way of the public key cryptosystem (RSA).

The server apparatus 20 derives DEK1 by decoding the notified PKs (DEK1) by the secret key (SKs) of the server (step 916). In other words, the server apparatus 20 functioning as the receiver decodes the session key by using the secret key (SKs) of the server corresponding to the own secret key. Thereafter, the content sent from the client apparatus 30 is decoded by the decoded session key.

The server apparatus 20 produces SKs(DEK1) by performing DEK1 with employment of the server secret key (SKs) (step 917).

Thereafter, the server apparatus 20 notifies DEK1 (SKs (DEK1)) produced by encrypting SKs(DEK1) by DEK1 to the client apparatus 30 (step 918, this notification is indicated by "D"). In this case, the reason why SKs(DEK1) is encrypted by DEK1 is that an electronic signature is not wiretapped. The reason why such an electronic signature is made is to investigate that the sender (user) is authenticated and the content of the statement is not falsified. For example, a signer "A" makes up a digest of the statement by using a proper hash function, and then encrypts this digest by employment of a secret key for this signer "A". This may constitute a signature. A verifier "B" verifies the signature by employing the public key of the signer "A" to be returned to the original signature so as to check whether or not this result is equal to the digest of the original statement. If this result is not equal to the digest of the original statement, then it can be seen that the statement is falsified.

Now, the client apparatus 30 executes the following items 1) to 3) as a process "P" (step 919). 1). DEK1(SKs(DEK1)) is decoded to derive SKs(DEK1). 2). DEK1 is derived from the derived SKs(DEK1) by employing the public key (PKs) contained in the certificate of the server. 3). The derived DEK1 is compared with DEK1 produced at the step 914.

With this comparison, the server is authenticated. The reason why this authentication is perform is to confirm as to whether or not the public key opened as the server certificate is really the key for-the server apparatus 20. This confirmation is performed by employing the server certificate (CERTs) authenticated by a third party. Such a confirmation is also called as "third party authentication", or "electronic notary public". Simply speaking, a counter party makes a signature on a mail sent by an owner, and if this signature decrypted by employing the public key of the third party is identical to the signature sent by the owner, then the authentication can be established.

As a comparison result of the item 3) at the step 919, if the received signature is identical to the original signature, then the client apparatus 30 notifies "ACK" to the server apparatus 20, whereas if the received signature is not identical to the original signature, then the client apparatus 30 notifies "NACK" to the server apparatus 20.

Next, the server apparatus 20 produces DEK2 corresponding to a seed for authentication (in this case, authentication of user) by using random numbers (step 921).

Subsequently, the server apparatus 20 notifies to the client apparatus 30, DEK1(DEK2) produced by encrypting DEK2 by utilizing the secret key cryptosystem (step 922, this notification is indicated by "F"). In this case, the reason why the secret key cryptosystem is employed is such that the encryption key DEK1 is commonly used in the client apparatus 30 and the server apparatus 20, and when this encryption key DEK1 is utilized, the processing speed can be increased. In other words, if all of the encryption is done by Public key Cryptosystem.

Subsequently, the client apparatus 30 derives DEK2 by decoding the DEK1(DEK2) notified from the server apparatus 20 by way of the secret key (SKm) of the user (step 923).

Also, the client apparatus 30 produces SKm(DEK2) by making an electronic signature with respect to DEK2 by employing the secret key (SKm) of the user (step 924).

Thereafter, the client apparatus 30 notifies DEK2(SKm (DEK2)) produced by encrypting SKm(DEK2) by using DEK2 (step 925, this notification is expressed by "G").

Now, the server apparatus 20 executes the following items 1) to 3) as a process "Q" (step 926). 1). DEK2(SKm(DEK2)) is decoded to derive SKm(DEK2). 2). DEK2 is derived from the derived SKm(DEK2) by employing the user secret key (SKm). 3). The derived DEK2 is compared with DEK2 produced at the step 921. With this comparison, the user is authenticated.

As a comparison result of the item 3) at the step 926, if the decrypted signature is identical to the original signature, then the server apparatus 20 notifies "ACK" to the client apparatus 30, whereas if the received signature is not identical to the original signature, then the server apparatus 20 notifies "NACK" to the client apparatus 30 (step 927, this notification is repressed by "H").

Thereafter, a communication is carried out by employing the session key DEK2 between the client apparatus 30 and the server apparatus 20 (step 928, this communication is indicated by "9").

(Sequential Process Operations Executed In Respective Security Levels)

The sequential process operations executed in the respective security levels will now be explained with reference to FIG. 11. First, in the security level "1", the above-explained process operations (1), (2), (3), (4), (5), (6), (7), (8) and (9) are carried out in this order.

Next, in the security level "2", the above-described process operations (1), (2), (3), (4), (5), (6), (7), (8), (B), (C) and (F) are performed in this order.

Then, in the security level "3", the above-described process operations (1), (2), (3), (4), (5), (6), (7), (8), (A), (B), (C), (F), (G) and (H) are sequentially executed.

Then, in the security level "4", the above-described process operations (1), (2), (3), (4), (5), (6), (7), (8), (B), (C), (D), (E) and (F) are sequentially executed.

Next, in the security level "5", the above-described process operations (1), (2), (3), (4), (5), (6), (7), (8), (B), (C) and (D), (E), (F), (G) and (H) are performed in this order.

(First Process Operation)

Figure 12:
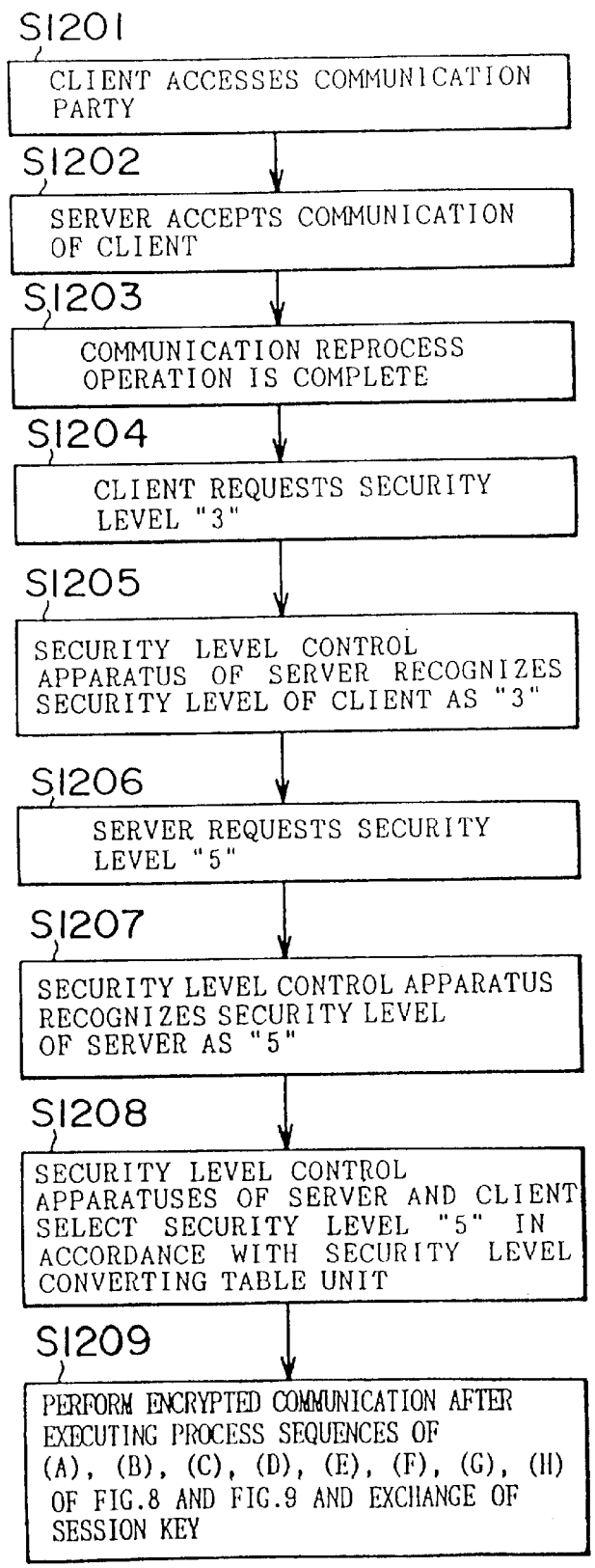
FIG. 12 is a flow chart for indicating a first process operation according to the embodiment.

Referring now to FIG. 12, the first process operation will be explained.

First, the client apparatus 30 (client) accesses a communication party (step 1201).

Next, the server apparatus 20 (server) accepts the communication by the client (step 1202).

At this stage, the communication preprocess operation is complete (step 1203).

Thereafter, the client requests the security level "3" (step 1204).

In response to this request, the security level control apparatus 10 of the server recognizes that the security level of the client is equal to "3" (step 1205).

Next, the server requests the security level "5" (step 1206).

In response to this request, the security level control apparatus 10 of the server recognizes that the security level of the client is equal to "5" (step 1207).

At this stage, the security level control apparatuses 10 of the server and the client select the security level "5" in accordance with the security level converting table unit 12 (step 1208).

Both the server and the client perform the encryption communication after executing the sequential process operations (A), (B), (C), (D), (E), (F), (G) and (H) of FIG. 9 and FIG. 10, and also exchange of the session keys (step 1209).

(Second Process Operation)

Figure 13:
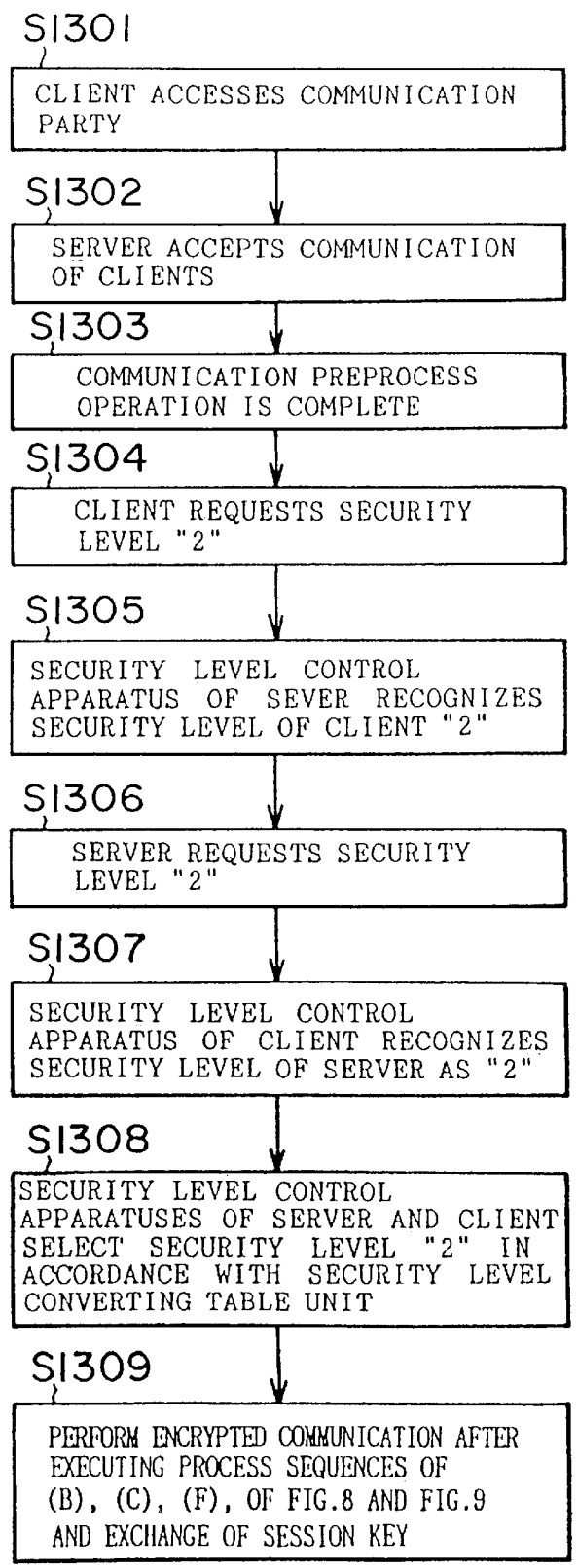
FIG. 13 is a flow chart for indicating a second process operation according to the embodiment.

Referring now to FIG. 13, the second process operation will be explained.

First, the client apparatus 30 (client) accesses a communication party (step 1301).

Next, the server apparatus 20 (server) accepts the communication by the client (step 1302).

At this stage, the communication preprocess operation is complete (step 1303).

Thereafter, the client requests the security level "2" (step 1304).

In response to this request, the security level control apparatus 10 of the server recognizes that the security level of the client is equal to "2" (step 1305).

Next, the server requests the security level "2" (In 1306).

In response to this request, the security level control apparatus 10 of the client recognizes that the security level of the server is equal to "2" (step 1307).

At this stage, the security level control apparatuses 10 of the server and the client select the security level "2" in accordance with the security level converting table unit 12 (step 1308).

Both the server and the client perform the encryption communication after executing the sequential process operations (B), (C), and (F) of FIG. 9 and FIG. 10, and also exchange of the session keys (step 1309).

As previously described in detail, the communication level is not determined based upon only the communication level requested by the counter party's apparatus, but the actual communication level is determined based on the communication levels requested by both parties' apparatuses in this embodiment. As a consequence, the following effects can be achieved. That is, in the case that this embodiment is applied to the Internet, when a communication is established between a server and a user apparatus (called as a "host" in the Internet field), the security level converting table unit 12 is arranged in such a manner that the level requested by the server owns a priority so as to avoid the problems even under such a condition that although the server wants to encrypt the information in order to avoid that other apparatuses may refer to this information, the user requests to communicate the "plain text".

Furthermore, the situation between the server and the client are changed, above mentioned effects of this invention can be achieved.

What is claimed is:

1. A security level control apparatus for controlling a security level of a communication established between communication parties, comprising:

security level recognizing means for recognizing a security level notified from a communication party;

security level converting table means for storing therein a relationship between an index having two sets of security levels and a security level of an actual communication;

security level reading means for setting the security level of the communication party recognized by said security level recognizing means and a security level owned by said security level control apparatus as said index, and for reading a security level corresponding to said index from said security level converting table means; and security level setting means for setting the security level read from said security level reading as the security level of said security level control apparatus.

2. A network communication system provided with a server apparatus and a client apparatus, which perform a communication whose security level is set, wherein said client apparatus includes a security level control apparatus; and said security level control apparatus includes:
      security level recognizing means for recognizing a security level notified from a communication party;
      security level setting means for setting the security level recognized by said security level recognizing means as a security level for said client apparatus; and
      security level converting table means for storing therein a relationship between an index having two sets of security levels and a security level of an actual communication.

3. A network communication system as claimed in claim 2 wherein said security level control apparatus provided with said client apparatus controls a security level with respect to the at least one server apparatus.

4. A network communication system as claimed in claim 2 wherein said security level control apparatus owned by said client apparatus includes:
      security level converting table means for storing therein a relationship between an index constituted by two sets of security levels and a security level of an actual communication; and
      security level reading means for setting the security level of said at least one server apparatus recognized by said security level recognizing means and a security level of said client apparatus designated as said index, and for reading a security level corresponding to said index from said security level converting table means, and said security level setting means sets the security level read out from said security level reading means as a security level for said client apparatus.

5. A network communication system provided with a server apparatus and at least one client apparatus, which perform a communication whose security level is set, wherein said server apparatus includes a security level control apparatus; and said security level control apparatus includes:
      security level recognizing means for recognizing a security level notified from a communication party;
      security level setting means for setting the security level recognized by said security level recognizing means as a security level for said server apparatus; and
      security level converting table means for storing therein a relationship between an index having two sets of security levels and a security level of an actual communication.

6. A network communication system as claimed in claim 5 wherein said security level control apparatus provided with said server apparatus controls a security level with respect to said at least one client apparatus.

7. A network communication system as claimed in claim 5 wherein said security level control apparatus owned by said server apparatus includes:
      security level converting table means for storing therein a relationship between an index constituted by two sets of security levels and a security level of an actual communication; and
      security level reading means for setting the security level of said at least one client apparatus recognized by said security level recognizing means and a security level of said server apparatus designated as said index, and for reading a security level corresponding to said index from said security level converting table means, and said security level setting means sets the security level read out from said security level reading means as a security level for said server apparatus.

8. A network communication system provided with at least one server apparatus and a client apparatus, which perform a communication whose security level is set, wherein said client apparatus includes a security level control apparatus, said security level control apparatus includes:
      security level recognizing means for recognizing a security level notified from a communication party; and
      security level setting means for setting the security level recognized by said security level recognizing means as a security level for said client apparatus, said security level control apparatus owned by said client apparatus includes:
      security level converting table means for storing therein a relationship between an index constituted by two sets of security levels and a security level of an actual communication; and
      security level reading means for setting the security level of said at least one server apparatus recognized by said security level recognizing means and a security level of said client apparatus designated as said index, and for reading a security level corresponding to said index from said security level converting table means, said security level setting means sets the security level read out from said security level reading means as a security level for said client apparatus, and said security level control apparatus owned by said client apparatus dynamically changes the security level in response to a request of said client apparatus even during executions of the communication.

9. A network communication system provided with a server apparatus and at least one client apparatus, which perform a communication whose security level is set, wherein said server apparatus includes a security level control apparatus, said security level control apparatus includes:

security level recognizing means for recognizing a security level notified from a communication party; and security level setting means for setting the security level recognized by said security level recognizing means as a security level for said server apparatus, said security level control apparatus owned by said server apparatus includes:

security level converting table means for storing therein a relationship between an index constituted by two sets of security levels and a security level of an actual communication; and security level reading means for setting the security level of said at least one client apparatus recognized by said security level recognizing means and a security level of said server apparatus designated as said index, and for reading a security level corresponding to said index from said security level converting table means, said security level setting means sets the security level read out from said security level reading means as a security level for said server apparatus, and said security level control apparatus owned by said server apparatus dynamically changes the security level in response to a request of said server apparatus even during executions of the communication.

10. A network communication system provided with a server apparatus and a client apparatus, which perform a communication whose security level is set, wherein:

said client apparatus and said server apparatus include security control apparatuses; and each of said security level control apparatus includes:

security level recognizing means for recognizing a security level notified from a communication party;

security level converting table means for storing therein a relationship between an index constituted by two sets of security levels and a security level of an actual communication;

security level reading means for setting the security level of the communication party recognized by said security level recognizing means and a security level for said security level control apparatus as said index, and for reading a security level corresponding to said index from said security level converting table means; and security level setting means for setting the security level read from said security level reading as the security level for said security level control apparatus.

11. A network communication system provided with at least one server apparatus and a client apparatus, which perform a communication whose security level is set, wherein said client apparatus includes a security level control apparatus, said security level control apparatus includes:

security level recognizing means for recognizing a security level notified from a communication party; and security level setting means for setting the security level recognized by said security level recognizing means as a security level for said at least one server apparatus, said security level control apparatus owned by said client apparatus includes:

security level converting table means for storing therein a relationship between an index constituted by two sets of security levels and a security level of an actual communication; and security level reading means for setting the security level of said at least one server apparatus recognized by said security level recognizing means and a security level of said client apparatus designated as said index, and for reading a security level corresponding to said index from said security level converting table means, said security level setting means sets the security level read out from said security level reading means as a security level for said client apparatus, said security level control apparatus owned by said client apparatus dynamically changes the security level in response to a request of said client apparatus even during executions of the communication, and said security level control apparatus owned by said server apparatus dynamically changes the security level in response to a request of said server apparatus even during executions of the communication.

12. A security level control method for controlling a security level of a communication established between communication parties, comprising the steps of:

recognizing a security level notified from a communication party;

storing a relationship between an index having two sets of security levels and a security level of an actual communication;

setting the security level of the communication party recognized by said recognizing step and a security level obtained by said security level control step designated as said index, and for obtaining a security level corresponding to said index from said storing step; and setting the security level obtained from said setting step.

13. A network communication system having a server and client, comprising:

a security level table storing a relationship, based on a recognized security level of a communication party, between an index having two sets of security levels and a security level of an actual communication; and a security level control apparatus controlling the security level of communications between the server and the client based on the security level table.

* * * * *